United States Patent
Barczak et al.

(10) Patent No.: US 10,705,977 B2
(45) Date of Patent: Jul. 7, 2020

(54) METHOD OF DIRTY CACHE LINE EVICTION

(71) Applicant: Intel Corporation, Santa Clara, CA (US)

(72) Inventors: Mariusz Barczak, Gdansk (PL); Igor Konopko, Gdansk (PL); Adam Rutkowski, Gdynia (PL)

(73) Assignee: Intel Corporation, Santa Clara, CA (US)

( * ) Notice: Subject to any disclaimer, the term of this patent is extended or adjusted under 35 U.S.C. 154(b) by 127 days.

(21) Appl. No.: 15/910,941

(22) Filed: Mar. 2, 2018

(65) Prior Publication Data
US 2019/0042470 A1   Feb. 7, 2019

(51) Int. Cl.
*G06F 12/12* (2016.01)
*G06F 12/0804* (2016.01)

(52) U.S. Cl.
CPC .......... *G06F 12/12* (2013.01); *G06F 12/0804* (2013.01); *G06F 2212/1021* (2013.01)

(58) Field of Classification Search
CPC ... G06F 12/0804; G06F 12/1021; G06F 12/12
See application file for complete search history.

(56) References Cited

U.S. PATENT DOCUMENTS

| | | | | |
|---|---|---|---|---|
| 5,542,066 A | * | 7/1996 | Mattson | G06F 12/0804 711/113 |
| 6,643,672 B1 | * | 11/2003 | Lebel | G06F 9/5016 |
| 2016/0196063 A1 | * | 7/2016 | Chung | G11C 16/06 711/103 |
| 2017/0038999 A1 | * | 2/2017 | Vanka | G06F 3/0653 |

* cited by examiner

*Primary Examiner* — Aracelis Ruiz
(74) *Attorney, Agent, or Firm* — Compass IP Law, PC

(57) ABSTRACT

Examples may include techniques to improve cache performance in a computing system. An eviction service may be used to manage a dirty list and a clean list, set a cache line to hot, set a cache line to clean, set a cache line to dirty, and evict a cache line from the cache. A cache engine may be used to write data into the cache at a cache line, request the eviction service to set the cache line to dirty, and manage a dirty cache lines counter for each chunk of the primary memory. A cleaning thread may be used to determine a dirtiest chunk of a primary memory, get a cache line of the dirtiest chunk, and when the cache line of the dirtiest chunk is dirty, read the cache line to get data from the cache, write the data to primary memory, request the eviction service to set the cache line to clean, and manage the dirty cache lines counters.

28 Claims, 9 Drawing Sheets

METHOD OF DIRTY CACHE LINE EVICTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Examples described herein are generally related to caching of data in a computing system.

BACKGROUND

In computing systems, a cache is a hardware or software component that stores data so future requests for that data can be served faster; the data stored in a cache might be the result of an earlier computation, or the duplicate of data stored elsewhere. A cache hit occurs when the requested data can be found in a cache, while a cache miss occurs when it cannot. Cache hits are served by reading data from the cache, which is faster than recomputing a result or reading from a slower data storage device such as a main memory; thus, the more requests can be served from the cache, the faster the computing system performs.

Computing hardware typically implements a cache as a block of memory for temporary storage of data likely to be used again. A cache is often part of a processor die or included in a data storage device to enable fast access to the data in the cache.

A cache is made up of a pool of entries, also called cache lines. Each entry has associated data, which is a copy of the same data in some other storage device. Each entry also has a tag, which specifies the identity of the data in the storage device of which the entry is a copy.

When the cache client (such as a processor) needs to access data presumed to exist in the storage device, the cache client first checks the cache. If a cache entry can be found with a tag matching that of the desired data, the data in the cache entry is used instead. This situation is known as a cache hit. The alternative situation, when the cache is consulted and found not to contain data with the desired tag, is known as a cache miss. The previously un-cached data fetched from the storage device during cache miss handling is usually copied into the cache, to be ready for the next access.

During a cache miss, the processor usually ejects some other entry in order to make room for the previously un-cached data. The algorithm used to select the entry to eject is known as the replacement policy. One popular replacement policy, the "least recently used" (LRU) eviction policy, replaces the least recently used entry with the newly fetched data.

When a system writes data to cache, it must at some point write that data to the storage device as well. The timing of this write is controlled by what is known as the write policy.

There are two basic writing approaches: 1) Write-through: write is done synchronously both to the cache and to the storage device; and 2) Write-back: initially, writing is done only to the cache. The write to the storage device is postponed until the cache blocks containing the data are about to be modified/replaced by new content.

A write-back cache is more complex to implement, since it needs to track which of its locations have been written over, and mark them as dirty for later writing to the storage device. The data in these locations are written back to the storage device when they are evicted from the cache, an effect referred to as a lazy write. For this reason, a read miss in a write-back cache (which requires a block to be replaced by another) will often require two memory accesses to service: one to write the replaced data from the cache back to the storage device (in order to synchronize dirty portions), and then one to retrieve the needed data from main storage.

DETAILED DESCRIPTION

As contemplated in the present disclosure, a cache, whether implemented in software or hardware, may be a type of structure for improving the performance of applications which frequently calculate and fetch data. Embodiments of the present invention provide high performance caching for random, write-intensive workloads and seek-sensitive primary storage. Embodiments provide for improved dirty cache line eviction performance, thereby improving key latency and bandwidth performance metrics.

When a write-back cache implements a LRU eviction policy, the least recently used cache lines are evicted from cache first. If a cache line to be evicted stores dirty data, its content is committed to the storage device. Some cache implementations are supplemented with opportunistic cleaning, where dirty data is flushed to the storage device during periods of low cache business.

Some cache implementations deliver low write-back caching performance for random, write-intensive workloads. Writing dirty data to the storage device before evicting dirty data adds significant overhead to I/O operations. Moreover, cleaning data, either upon eviction or opportunistically, is typically driven by the least-recently-used approach, resulting in committing randomly distributed data to the storage device. This degrades cleaning performance for seek-sensitive storage devices and results in low cleaning throughput, and generally for application throughput. As a consequence, high levels of dirty cache lines are maintained, widening the data vulnerability window and extending the time required for transition to write-through mode (which involves cleaning all dirty cache lines).

In embodiments of the present invention, cache acceleration logic may be combined with one or more caches and high-performance storage devices in a computing system to increase application performance via intelligent caching. Cache acceleration logic allows system administrators to target high performance of computing systems directly to the applications and data that add the most value to the efficient functioning of the computing systems. Cache acceleration logic may interoperate with one or more caches, primary memory and one or more storage devices to create a multilevel cache that optimizes the use of system memory and automatically determines the best cache level for active data according to a selected cache configuration policy, thereby allowing applications to perform faster. In one embodiment, a portion of cache acceleration logic may be installed into the operating system (OS), providing a cache configuration policy solution that is transparent to users and applications, and a portion may also be installed into back end storage in the data center. In embodiments, the cache acceleration logic may transparently accelerate applications, deliver application specific performance improvements, provide increased data access performance without added migration costs, and reduce storage latency.

Figure 1:
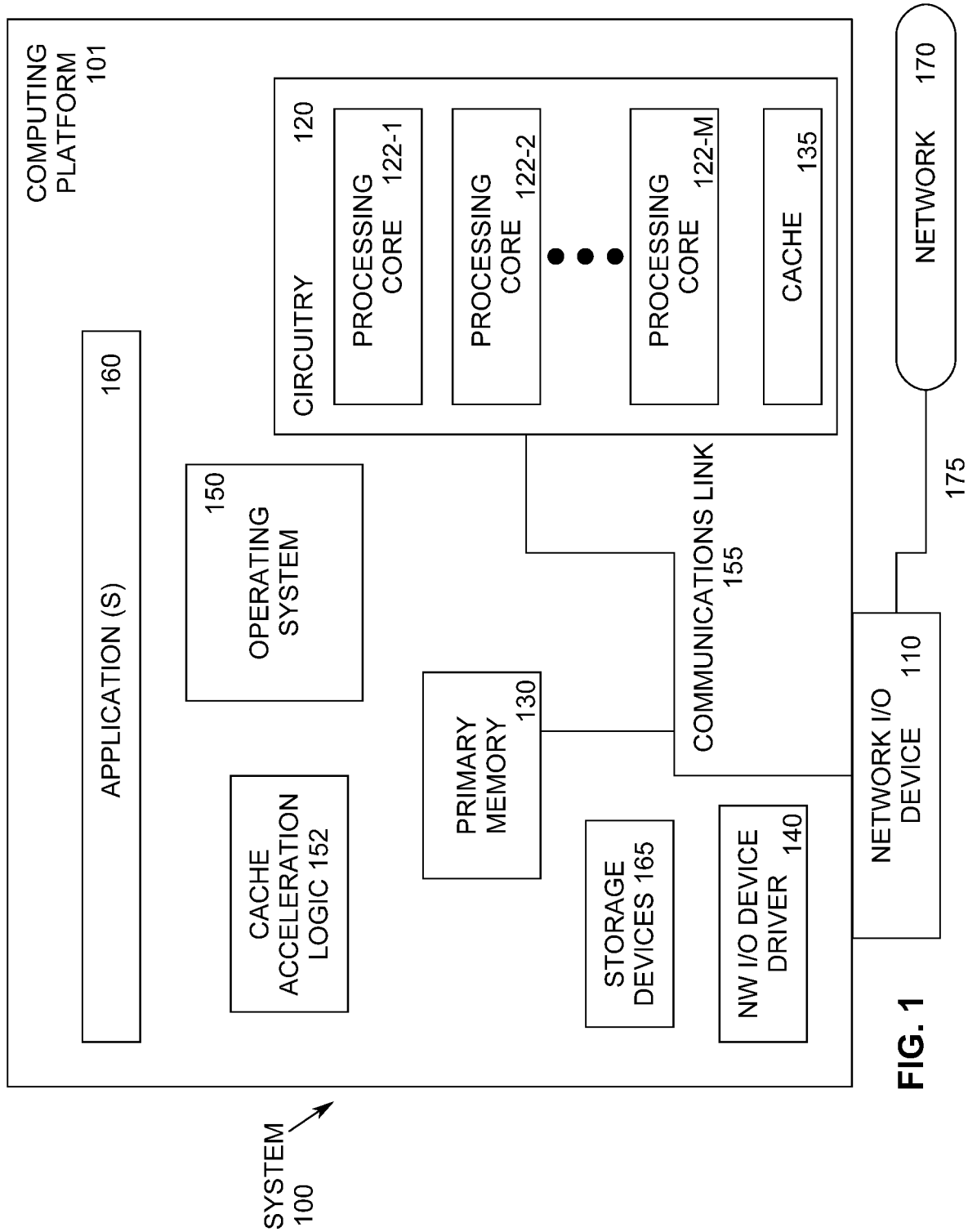
FIG. 1 illustrates an example computing system.

FIG. 1 illustrates an example computing system 100. As shown in FIG. 1, computing system 100 includes a computing platform 101 coupled to a network 170. In some examples, as shown in FIG. 1, computing platform 101 may couple to network 170 via a network communication channel 175 and through a network I/O device 110 (e.g., a network interface controller (NIC)) having one or more ports connected or coupled to network communication channel 175.

According to some examples, computing platform 101, as shown in FIG. 1, may include circuitry 120, primary memory 130, a network (NW) I/O device driver 140, an operating system (OS) 150, one or more application(s) 160, storage devices 165, and cache acceleration logic 152. In at least one embodiment, operating system 150 may include cache acceleration logic 152, and storage devices 165 may be one or more of hard disk drives (HDDs) and/or solid-state drives (SSDs). In an embodiment, storage devices 165 may be non-volatile memories (NVMs). In other embodiments, cache acceleration logic 152 may be implemented as system software apart from the OS. In some examples, as shown in FIG. 1, circuitry 120 may communicatively couple to primary memory 130 and network I/O device 110 via communications link 155. Although not shown in FIG. 1, in some examples, operating system 150, NW I/O device driver 140 or application(s) 160 may be implemented, at least in part, via cooperation between one or more memory devices included in primary memory 130 (e.g., volatile or non-volatile memory devices) and elements of circuitry 120 such as processing cores 122-1 to 122-m, where "m" is any positive whole integer greater than 2

In some examples, computing platform 101, may include, but is not limited to, a server, a server array or server farm, a web server, a network server, an Internet server, a work station, a mini-computer, a main frame computer, a supercomputer, a network appliance, a web appliance, a distributed computing system, multiprocessor systems, processor-based systems, or a combination thereof. Also, circuitry 120 having processing cores 122-1 to 122-m may include various commercially available processors, including without limitation Intel® Atom®, Celeron®, Core (2) Duo®, Core i3, Core i5, Core i7, Itanium®, Pentium®, Xeon® or Xeon Phi® processors; and similar processors. Circuitry 120 may include at least one cache 135 to store data.

According to some examples, primary memory 130 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 130 may include one or more hard disk drives within and/or accessible by computing platform 101.

Figure 2:
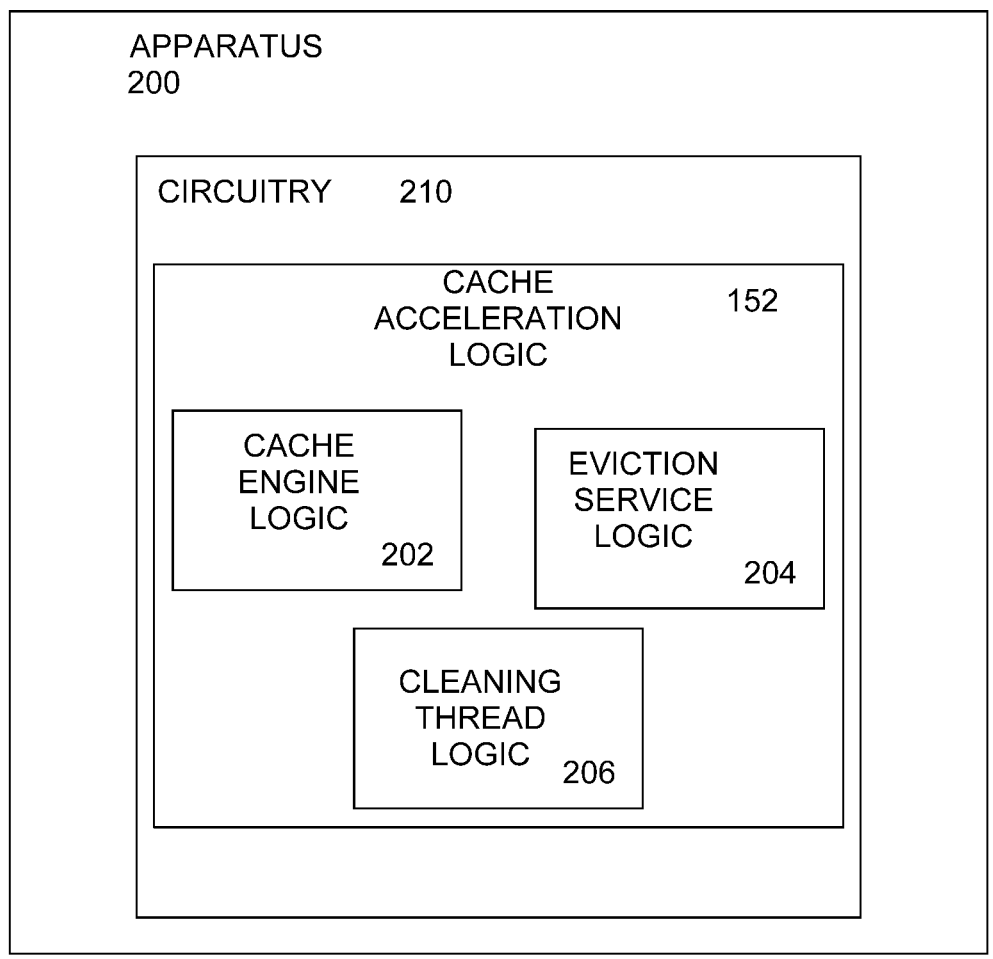
FIG. 2 illustrates an example apparatus.

FIG. 2 illustrates an example block diagram for an apparatus 200. Although apparatus 200 shown in FIG. 2 has a limited number of elements in a certain topology, it may be appreciated that the apparatus 200 may include more or less elements in alternate topologies as desired for a given implementation.

According to some examples, apparatus 200 may be associated with logic and/or features of processing logic (i.e., cache acceleration logic 152 as shown in FIG. 1) hosted by computing platform 101 and may be supported by circuitry 210. For these examples, circuitry 210 may be incorporated within circuitry, processor circuitry, a processing element, a processor, a CPU or a core maintained at the computing platform 101. Circuitry 210 may be arranged to execute one or more software, firmware or hardware implemented modules, components or logic 202, 204, and 206. Module, component or logic may be used interchangeably in this context. The examples presented are not limited in this context and the different variables used throughout may represent the same or different integer values. Also, "logic", "module" or "component" may also include software/firmware stored in computer-readable media, and although the types of logic are shown in FIG. 2 as discrete boxes, this does not limit these components to storage in distinct computer-readable media components (e.g., a separate memory, etc.).

Circuitry 210 may be all or at least a portion of any of various commercially available processors, including without limitation an Intel® Atom®, Celeron®, Core (2) Duo®, Core i3, Core i5, Core i7, Itanium®, Pentium®, Xeon®, Xeon Phi® and XScale® processors; or similar processors. According to some examples, circuitry 210 may also include an application specific integrated circuit (ASIC) and at least some logic 202, 204, 206 may be implemented as hardware elements of the ASIC. According to some examples, circuitry 210 may also include a field programmable gate array (FPGA) and at least some logic 202, 204, 206 may be implemented as hardware elements of the FPGA.

According to some examples, apparatus 200 may include cache engine logic 202, eviction service logic 204, and cleaning thread logic 206. Cache engine logic 202, eviction service logic 204, and cleaning thread logic 206 may be executed or implemented by circuitry 210 to perform processing as described with reference to FIGS. 3-6 described below.

Various components of apparatus 200 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Figure 3:
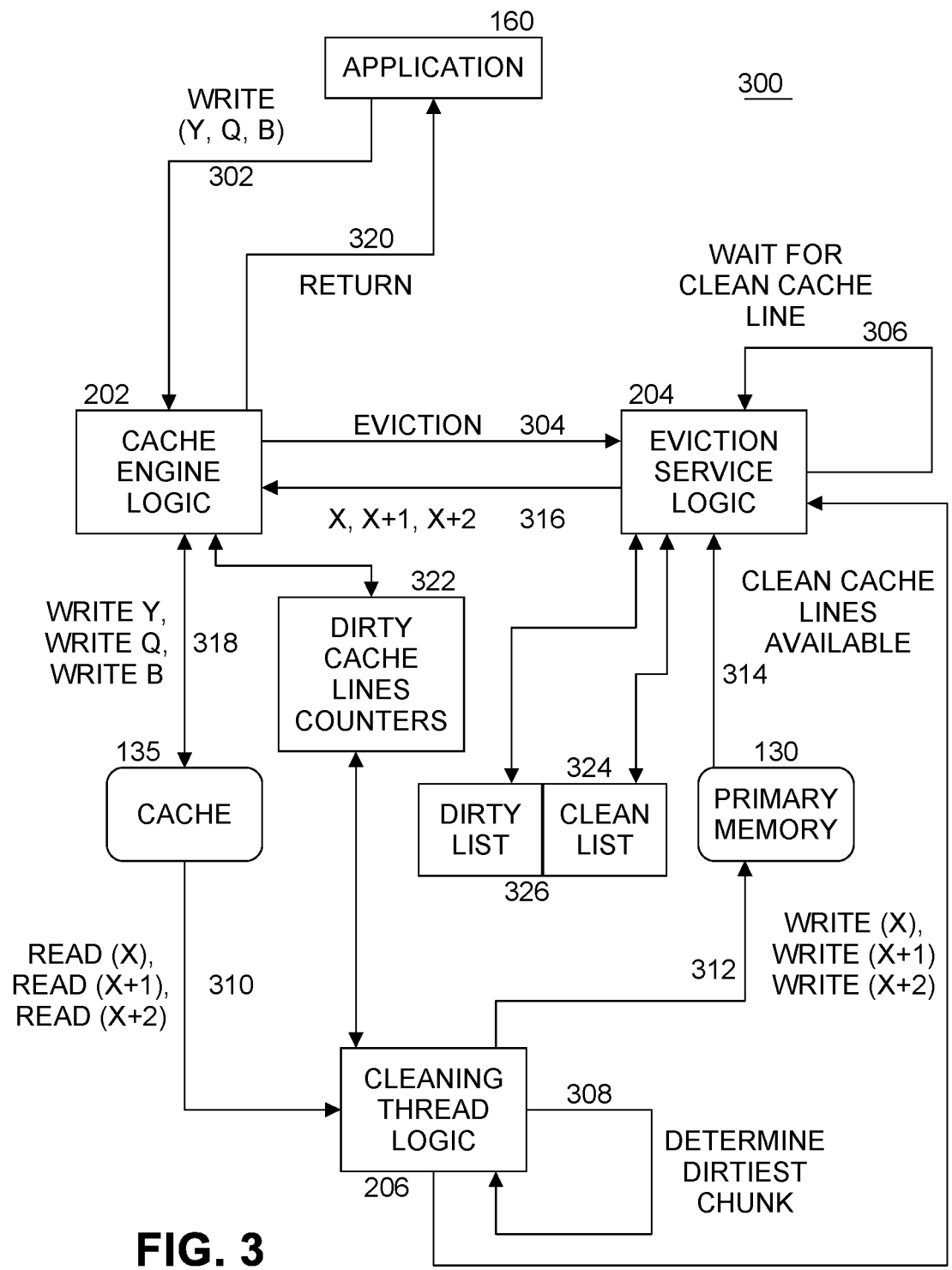
FIG. 3 illustrates an example cache system.

FIG. 3 illustrates an example cache system. Embodiments of the present invention provide an improved LRU eviction process and seek distance aware cleaning policy. Eviction candidates may be selected from a clean cache lines list, such as clean list 324. Cleaning may be performed concurrently to user workloads, using a process designed to reduce primary memory seek distances. Embodiments improve write-back cache performance for random, write-intensive workloads and seek sensitive primary memory. Additionally, embodiments allow the cache to maintain lower levels of dirty cache lines.

In an embodiment, cleaning thread logic 206 operates in the background (e.g., in a separate processing thread than cache engine logic 202 and eviction service logic 204), concurrently to performance of the user workload. Cleaning thread logic 206 divides the logical block address (LBA) domain of primary memory 130 into continuous chunks of fixed length (e.g., 100 MB). In each iteration the chunk with highest number of dirty cache lines may be selected for cleaning. All dirty cache lines within a selected chunk may be committed to primary memory 130, ordered by ascending primary memory LBA. This minimizes primary storage seek distance, allowing the cleaning thread logic to achieve high throughput. In embodiments of the present invention, dirtiest chunk-based cleaning leads to sequential write operations and lower synchronization latency.

In order to detect dirty chunks in an efficient manner, a dirty cache lines counter 322 may be maintained for each chunk in primary memory 130. The value of the dirty cache lines counter for each chunk represents the total number of dirty cache lines storing data belonging to the chunk. During cleaning candidate lookup, cleaning thread logic 206 finds the highest value of the dirty cache lines counters 322 amongst all primary memory chunks.

Embodiments include an improved eviction process, designed to benefit from asynchronous, sequential cleaning. In embodiments, a single eviction LRU list as is typically used in known implementations may be replaced by two eviction LRU lists, one for clean pages (clean list 324) and a second one for dirty pages only (dirty list 326). In the case of a cache miss, the least recently used cache line from clean list 324 may be evicted from cache 135. Having a separate clean list 324 allows for clean page lookup in constant time. In case there is no clean cache line to evict, a write operation may be suspended until a cache line is cleaned by cleaning thread logic 206. This allows for efficient eviction when the entire cache 135 is dirty, since cleaning thread logic 206 may be optimized for maximum write bandwidth to primary memory 130. As a result, in embodiments cache eviction throughput is limited by primary memory sequential write bandwidth rather than the primary memory's random write performance.

A request to write data may be made by application 160. For example, a request 302 to write data at addresses in primary memory 130 denoted by Y, Q, and B may be sent by application 160 to cache engine logic 202 within cache acceleration logic 152. At this point cache engine logic selects cache lines to store application data. If there are unused cache lines, they are utilized first. Otherwise cache engine logic 202 requests an eviction 304 from eviction service logic 204 and associates evicted cache lines with primary storage addresses Y, Q and B. Cache engine logic 202 updates cache 135 by writing 318 application data to cache lines associated with primary storage addresses Y, Q, and B. In addition, cache engine logic 202 updates the dirty cache line counter 322 for the chunk(s) of memory containing Y, Q, and B. Cache engine logic 202 processing may be done and processing control may be returned at 320 to the application.

Eviction service logic 204 services eviction 304 request by returning least recently used cache lines from clean LRU list 324. If there are insufficient number of cache lines on clean LRU list 324, then eviction service logic waits for clean cache lines 306. After cleaning thread 206 finishes cleaning cache lines associated with primary storage addresses X, X+1 and X+2 (in this example), cache lines are moved to clean LRU list 324. At this point eviction service logic 204 returns cache lines associated with primary storage addresses X, X+1, X+2 to satisfy the eviction request.

In an embodiment, cleaning thread logic 206 runs in a separate processing thread asynchronously from a cache engine logic/eviction service logic thread. Cleaning thread logic 202 divides primary memory 130 into fixed size chunks (e.g., 100 MB in one example) and maintains dirty cache lines counters 322. Cleaning thread logic 206 determines the dirtiest chunk of primary memory 130 shown by line 308 by analyzing the dirty cache lines counters 322. In an embodiment, the dirtiest chunk is the one having the most associated cache lines that are dirty. Dirty cache lines associated with primary storage addresses X, X+1, X+2 (in this example) within the dirtiest chunk are cleaned in an ascending order in primary memory 130 (e.g., from a lower LBA to an upper LBA to optimize seek distance). Cleaning involves reading 310 data from cache 135 and writing 312 data to primary storage addresses X, X+1 and X+2 (in this example). Cleaning thread logic 206 also updates dirty cache lines counters 322 for the chunks having the newly cleaned cache lines. Eviction service logic 204 may be notified that clean cache lines are now available at 314.

Figure 4:
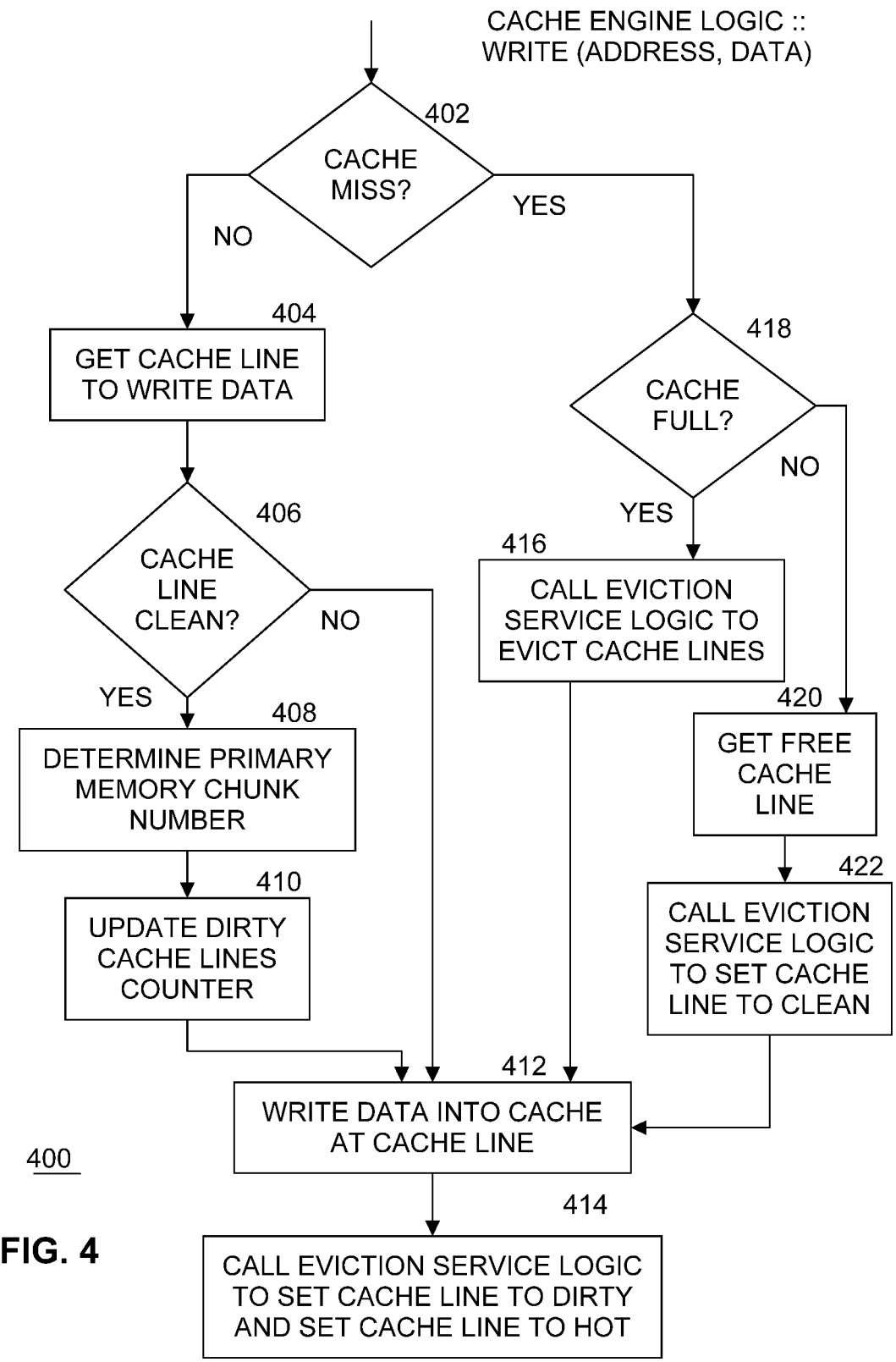
FIG. 4 illustrates an example logic flow of cache engine logic.

FIG. 4 illustrates an example logic flow of a cache engine. Logic flow 400 may be representative of some or all of the operations executed by one or more logic, features, or devices described herein, such as apparatus 200. More particularly, logic flow 400 may be implemented by at least cache engine logic 202. Application 160 may call cache engine logic 202 to write data to an address as shown as line 302 of FIG. 3. In an embodiment, there may be one or more address and data pairs sent from application 160 to cache engine logic 202. For each address and data pair, cache engine logic at block 402 determines if there is a cache miss for the address. If there is not a cache miss for the address, cache engine logic may get a cache line to write the data to at block 404 using the address. At block 406, if the cache line is clean, cache engine logic determines a number of a chunk of memory in primary memory 130 at block 408. Cache engine logic then updates the dirty cache lines counter 322 corresponding to the chunk number at block 410. Processing continues at block 412. If at block 406 the cache line is dirty (i.e., not clean), processing continues at block 412. If there is a cache miss for the address, cache engine logic determines if the cache is full at block 418. If the cache is full, cache engine logic calls eviction service logic 204, as shown line 304 in FIG. 3, to evict cache lines from cache 135 at block 416. Processing then continues at block 412. If the cache is not full at block 418, cache engine logic gets a free cache line at block 420, and calls eviction service logic to set the cache line to clean at block 422. Processing then continues at block 412. At block 412, cache engine logic may write the data into cache 135 (as shown as line 318 in FIG. 3). At block 414, cache engine logic may call eviction service logic to set the cache line to dirty and to set the cache line to hot. Blocks 402 through 426 may be repeated for each address and data pair.

Figure 5:
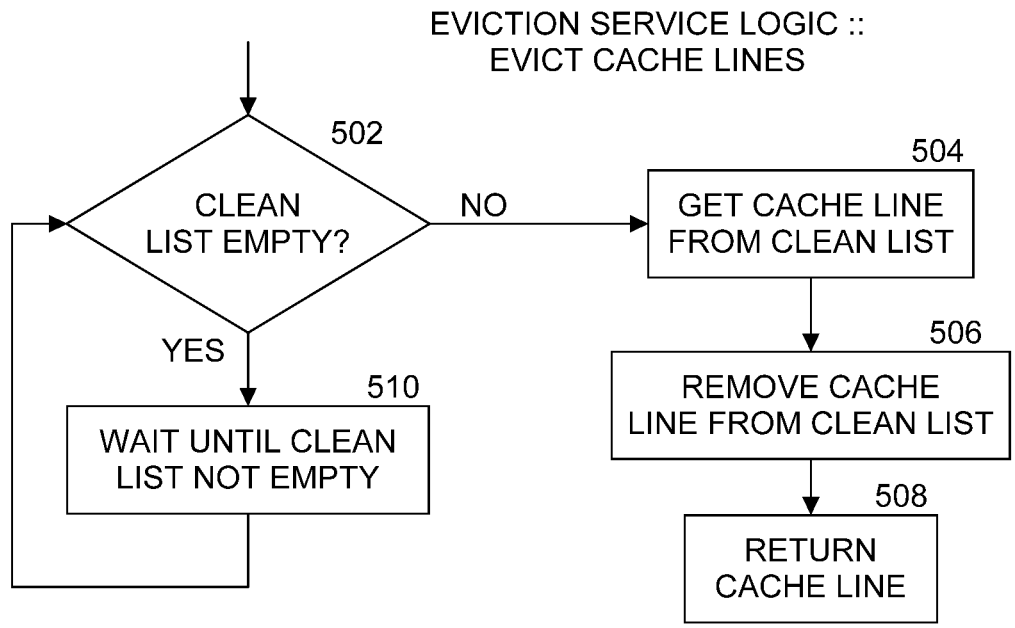
FIG. 5 illustrates an example logic flow of eviction service logic.
Figure 5:
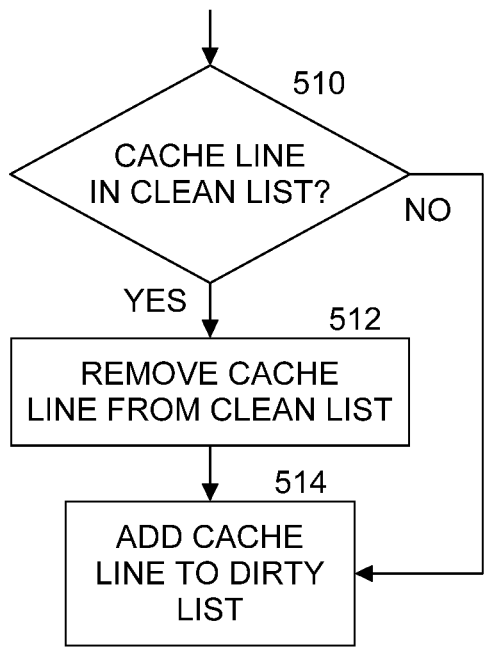
Figure 5:
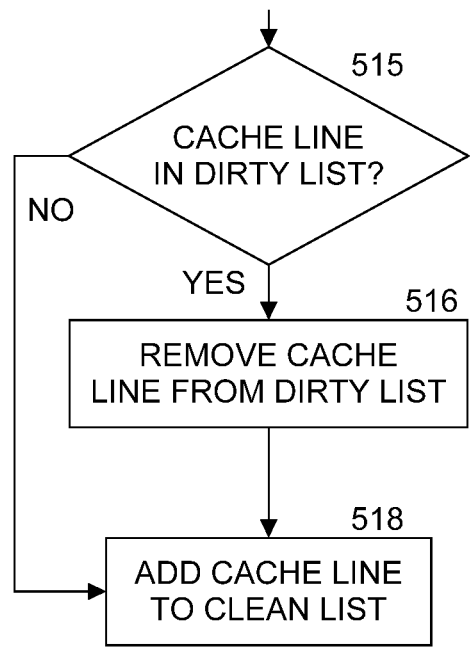

FIG. 5 illustrates an example logic flow of an eviction service. Logic flow 500 may be representative of some or all of the operations executed by one or more logic, features, or devices described herein, such as apparatus 200. More particularly, logic flow 500 may be implemented by at least eviction service logic 204. In an embodiment, eviction service logic 204 may include logic to evict cache lines. At block 502, eviction service logic may determine if clean list 324 is empty. If the clean list is empty, eviction service logic may wait until the clean list is not empty at block 510 (as shown by line 306 of FIG. 3). If the clean is list is not empty, then eviction service logic gets a cache line from the clean at block 504. In one embodiment, the cache line may be obtained from the tail of the clean list. At block 506, the cache line may be removed from the clean list, and the cache line may be returned at block 508 (as shown by line 316 of FIG. 3).

In an embodiment, eviction service logic 204 may include logic to set a cache line to dirty. At block 510, if the cache line is in clean list 324, eviction service logic may remove the cache line from the clean list at block 512. At block 514, dirty list 326 may be updated. In one embodiment, updating the dirty list includes adding the cache line to the head of the dirty list. If the cache line is not in the clean list, processing moves directly to block 514.

In an embodiment, eviction service logic 204 may include logic to set a cache line to clean. At block 515, if the cache line is in the dirty list, at block 516, eviction service logic may remove the cache line from dirty list 326. At block 518, the cache line may be added to clean list 324. If the cache line is not in the dirty list, processing moves directly to block 518.

Figure 6:
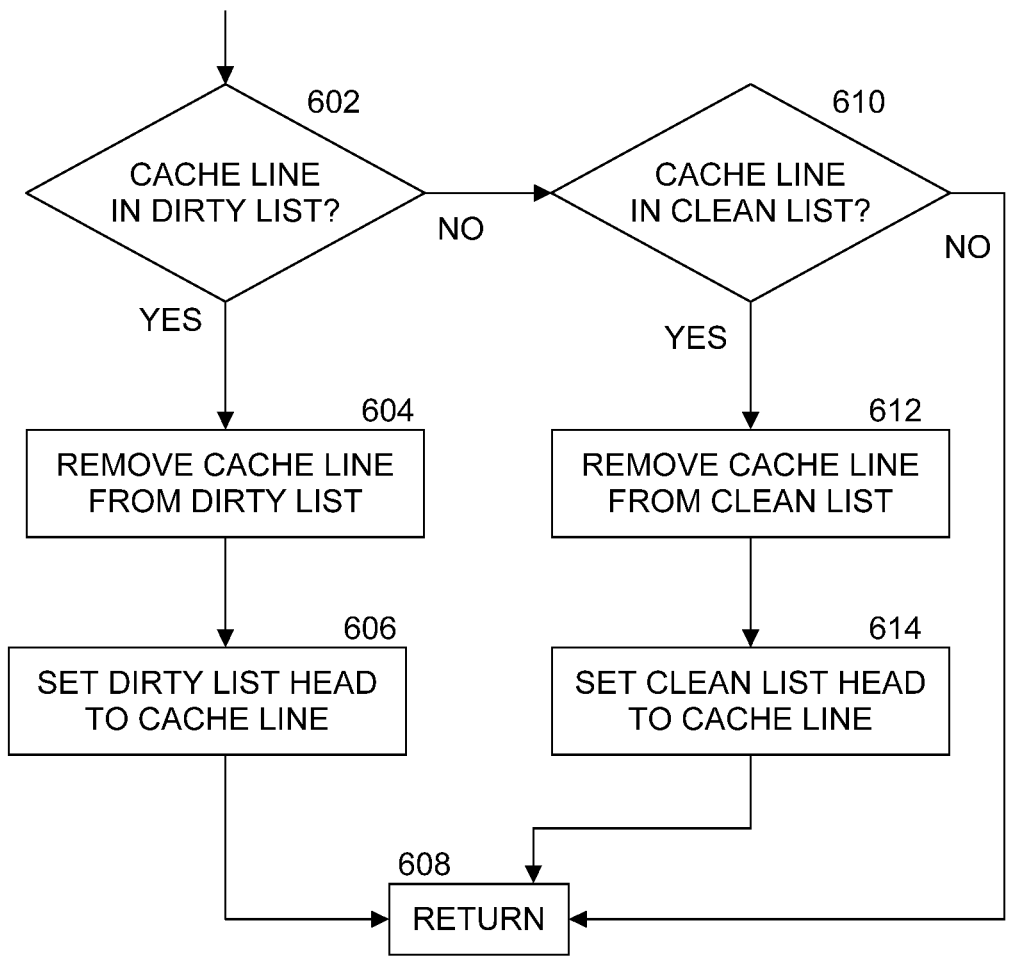
FIG. 6 illustrates an example logic flow of eviction service logic.

FIG. 6 illustrates an example of eviction service logic. In an embodiment, eviction service logic 204 may include logic to set a cache line to hot. At block 602, if the cache line is in dirty list 326, eviction service logic may remove the cache line from the dirty list at block 604. Eviction service logic then sets the head of the dirty list to the cache line at block 606, and returns to the caller at block 608. If at block 602 the cache line is not in the dirty list, processing continues with block 610. At block 610, if the cache line is in clean list 324, eviction service logic may remove the cache line from the clean list at block 612. Eviction service logic then sets the head of the clean list to the cache line at block 614, and returns to the caller at block 608. If at block 610 the cache line is not in the clean list, then processing returns at block 608.

Figure 7:
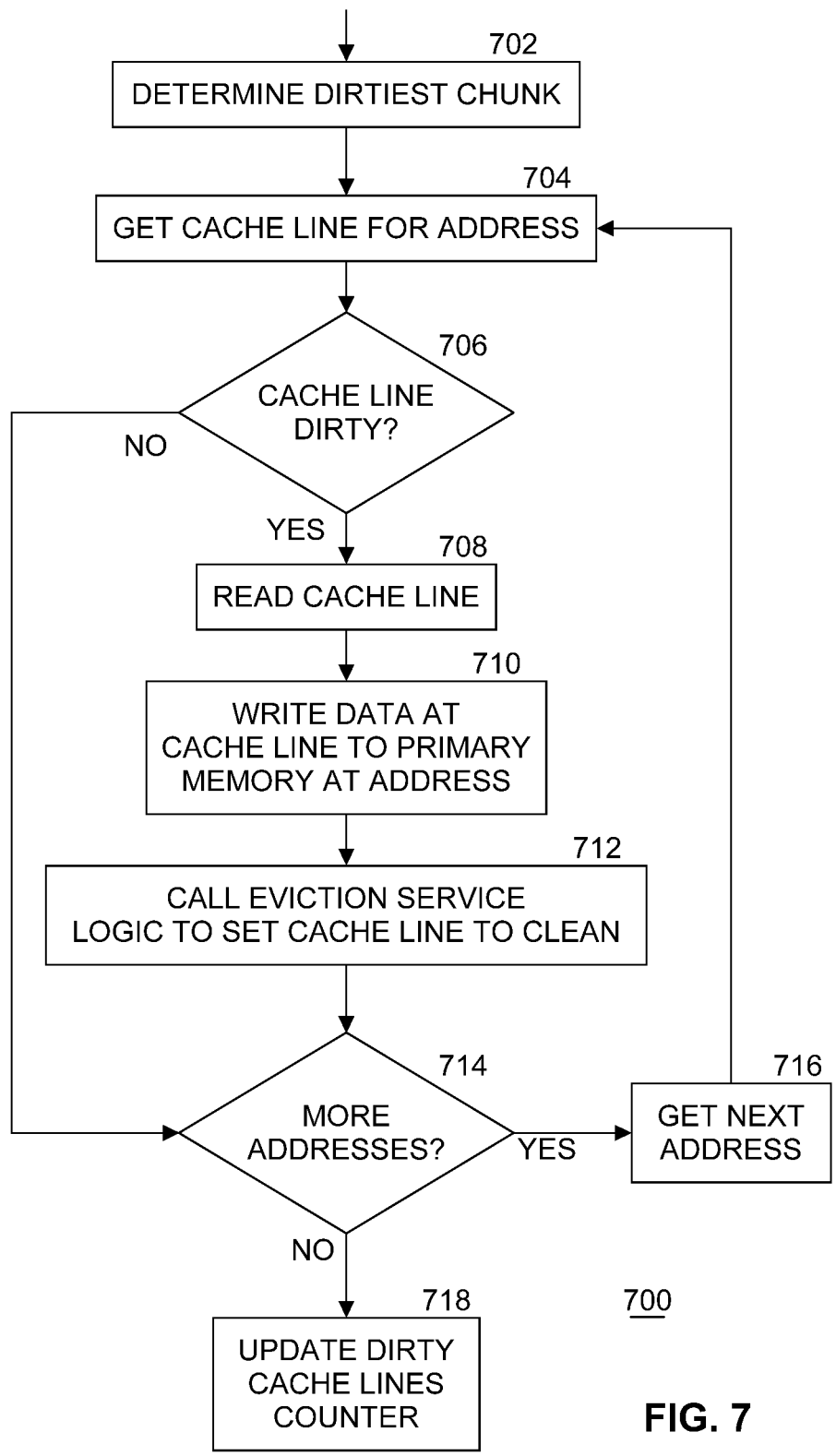
FIG. 7 illustrates an example flow of cleaning thread logic.

FIG. 7 illustrates an example logic flow of a cleaning thread. Logic flow 700 may be representative of some or all of the operations executed by one or more logic, features, or devices described herein, such as apparatus 200. More particularly, logic flow 700 may be implemented by at least cleaning thread logic 206. In an embodiment, cleaning thread logic may be implemented as an independent process, task or thread in a multiprocessing computing system such as computing platform 101. In one embodiment, cleaning thread logic may be executed repeatedly to continuously clean the cache. At block 702 cleaning thread logic determines the dirtiest chunk of primary memory 130. In one embodiment, cleaning thread logic analyzes dirty cache lines counters 322 to identify a primary storage chunk with the highest value of a dirty cache line counter. If there are no dirty chunks, cleaning thread logic may wait for a period of time and then check for dirty chunks again. At block 704, cleaning thread logic 206 gets the cache line for the first address of the dirtiest chunk (e.g., a current cache line for a current address). If this cache line is not dirty (i.e., is clean) at block 706, cleaning thread logic may check for more addresses to process at block 714. If there are more addresses in the dirtiest chunk to process, cleaning thread logic gets the next address in the dirtiest chunk at block 716 and processing continues back at block 704. If the cache line is dirty at block 706, cleaning thread logic may read the cache line at block 708 to get the data presently stored in cache 135 at the current cache line (as shown in line 310 of FIG. 3). This data is written to primary memory 130 at the address being processed. Next, at block 612 cleaning thread logic 206 may call eviction service logic 204 to set the cache line to clean (as described in FIG. 5, blocks 516 through 518). Cleaning thread logic may now check for more addressed to process in this chunk at block 714. If there are no more addresses to process, at block 718 the dirty cache lines counter 322 for this chunk may be updated to reflect the newly cleaned cache line.

In an embodiment, cache engine logic 202, eviction service logic 204, and cleaning thread logic 206 may be implemented as shown in the following pseudocode. In other embodiments, these components may be implemented in different ways.

```
© 2018 Intel Corporation
num_chunks = primary_storage_size / chunk_size
dirty_counter[num_chunks]
get_chunk(primary_storage_address) {
    return round_down(primary_storage_address / chunk_size)}
chunk_start(chunk_id) {
    chunk_id * chunk_size
chunk_end(chunk_id) {
    chunk_id * chunk_size + chunk_size }
cache_engine::write(addr, data){
  if (cache_miss(addr)) {
     if (cache_full( ))
         cache_line = eviction_service::evict_cache_lines( )}}
     else {
         cache_line = get_free_cache_line( )}}
         eviction_service::set_clean(cache_line)
   else {
     // get cache line storing data for primary storage address 'addr'
     cache_line = get_cache_line(addr)
     if (is_clean(cache_line)) {
         // update target chunk dirty counter
         primary_storage_chunk = get_chunk(addr)
         dirty_counter[primary_storage_chunk]++}}
   cache::write(cache_line, addr)
   eviction_service::set_dirty(cache_line)
   eviction_service::set_hot(cache_line)}
eviction_service::set_dirty(cache_line)
{
   if (list_contains(clean_lru_list, cache_line)) {
       remove_from_list(clean_lru_list; cache_line)}
   add_to_list(dirty_lru_list, cache_line)}
eviction_service::set_clean(cache_line)
{
   if (list_contains(dirty_lru_list, cache_line)) {
       remove_from_list(dirty_lru_list, cache_line)}
   add_to_list(clean_lru_list, cache_line)}
eviction_service::set_hot(cache_line)
{
   if (list_contains(dirty_lru_list, cache_line)) {
       remove_from_list(dirty_lru_list, cache_line)
       set_list_head(dirty_lru_list, cache_line)}
   else if (list_contains(clean_lru_list, cache_line)) {
       remove_from_list(clean_lru_list, cache_line)
       set_list_head(clean_lru_list, cache_line)}
}
```

-continued

```
eviction_service::evict_cache_lines( ) {
    if (list_empty(clean_lru_list))
        wait_until_not_empty(clean_lru_list)
    cache_line = list_tail(clean_lru_list)
    remove_from_list(clean_lru_list, cache_line)
    return cache_line}
cleaning_thread::get_dirtiest_chunk( ){
    dirtiest_chunk = -1
    max_dirty_lines_per_chunk = -1
    for (i=0; i<num_chunks; i++) {
        if (dirty_counter[i] > max_dirty_lines_per_chunk) {
            dirtiest_chunk = i
                max_dirty_lines_per_chunk = dirty_counter[i] }}
        return dirtiest_chunk;}
    cleaning_thread::main_loop( ){
        while (true) {
            chunk = cleaning_thread::get_dirtiest_chunk( )
            if (chunk == -1) {
                // no dirty data
                sleep( )
                continue}
            cleaned_cache_lines = 0
            for (addr = chunk_start(chunk); addr += cache_line_size;
addr < chunk_end(chunk)) {
                // get cache line storing data for primary storage address
                'addr'
                cache_line = get_cache_line(addr)
                if (is_dirty(cache_line)) {
                    data = cache::read(cache_line)
                    primary_memory::write(addr, data);
                    eviction_service::set_clean(cache_line)
                    cleaned_cache_lines++}}
            dirty_counter[chunk] -= cleaned_cache_lines}}
```

Figure 8:
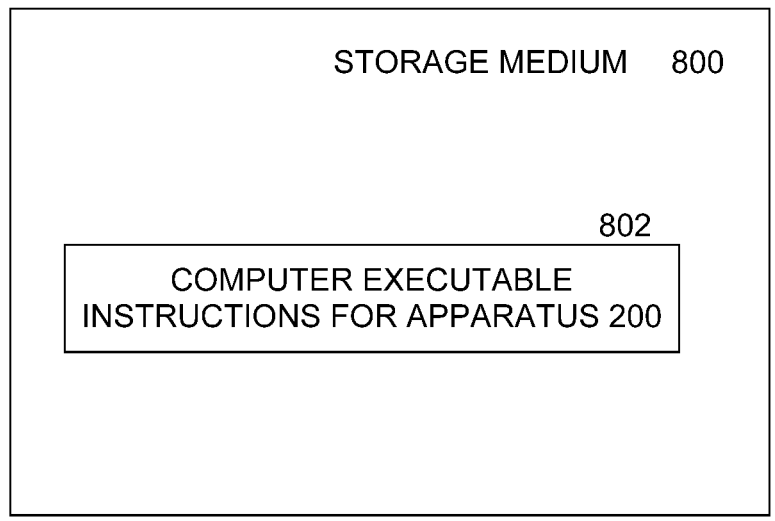
FIG. 8 illustrates an example of a storage medium.

FIG. 8 illustrates an example of a storage medium 800. Storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions 802 for apparatus 200 to implement logic flows 400, 500, 600, and 700. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
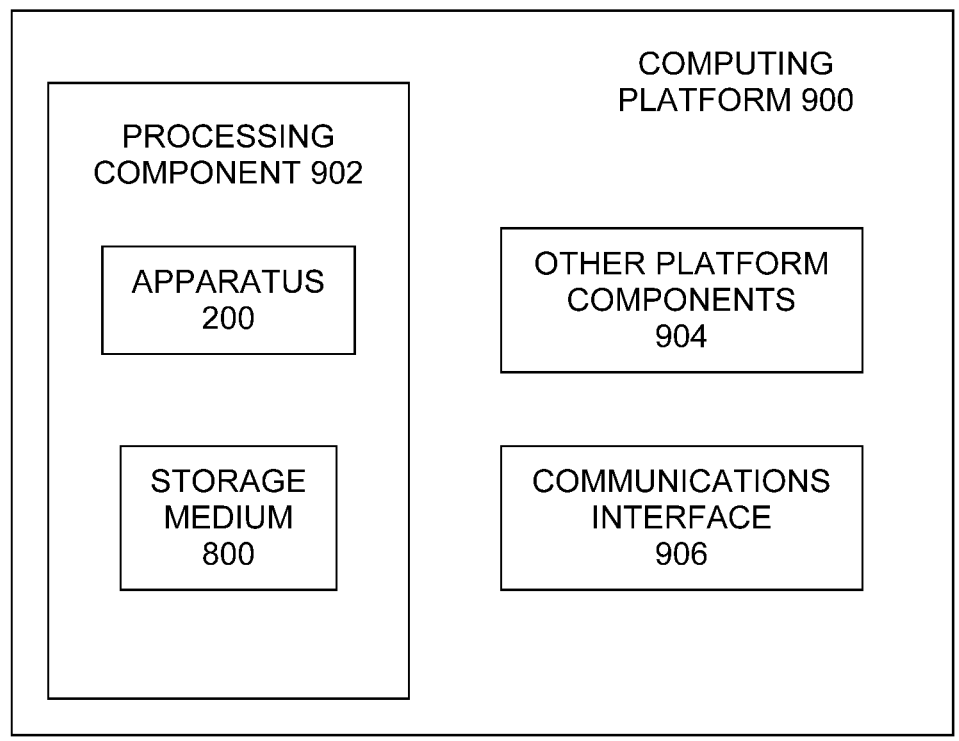
FIG. 9 illustrates an example computing platform.

FIG. 9 illustrates an example computing platform 900. In some examples, as shown in FIG. 9, computing platform 900 may include a processing component 902, other platform components 904 and/or a communications interface 906.

According to some examples, processing component 902 may execute processing operations or logic for apparatus 200 and/or storage medium 800. Processing component 902 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 904 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D cross-point memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 906 may include logic and/or features to support a communication interface. For these examples, communications interface 906 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Switch Specification.

The components and features of computing platform 900 may be implemented using any combination of discrete circuitry, ASICs, logic gates and/or single chip architectures. Further, the features of computing platform 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus coupled to a cache and a primary memory, the apparatus comprising:
   circuitry; and
   first logic for execution by the circuitry to manage a list of dirty cache lines and a list of clean cache lines, set a cache line to hot, set a cache line to clean, set a cache line to dirty, and evict a cache line from the cache;
   second logic for execution by the circuitry to write first data into the cache at a first cache line, request the first logic to set the first cache line to hot and to dirty, and manage a dirty cache lines counter for each chunk of the primary memory; and
   third logic for execution by the circuitry to determine a dirtiest chunk of the primary memory, get a second cache line of the dirtiest chunk, and when the second cache line of the dirtiest chunk is dirty, read the second cache line to get second data from the cache, write the second data to the primary memory, request the first logic to set the second cache line to clean, and manage the dirty cache lines counters;
   wherein the third logic for execution by the circuitry repeats the getting a second cache line of the dirtiest chunk, and when the second cache line of the dirtiest chunk is dirty, reading the second cache line to get second data from the cache, writing the second data to the primary memory, and requesting the first logic to set the second cache line to clean, for each cache line in the dirtiest chunk of the primary memory.

2. The apparatus of claim 1, comprising the first logic to set the first cache line to dirty by removing the first cache line from the list of clean cache lines when the first cache line is in the list of clean cache lines and by adding the first cache line to a head of the list of dirty cache lines.

3. The apparatus of claim 1, comprising the first logic to set the second cache line to clean by removing the second cache line from the list of dirty cache lines and adding the second cache line to the list of clean cache lines.

4. The apparatus of claim 1, comprising the first logic to evict a cache line from the cache by getting a third cache line from the list of clean cache lines, removing the third cache line from the list of clean cache lines, and returning the third cache line to the second logic.

5. The apparatus of claim 1, comprising the second logic to request the first logic to evict cache lines from the cache when a cache miss occurs.

6. The apparatus of claim 1, comprising the second logic to, when a cache miss does not occur, get a fourth cache line to write the first data, determine if the fourth cache line is clean, and when clean determine a chunk of the primary memory and update the dirty cache lines counter for the primary memory chunk.

7. The apparatus of claim 1, comprising the third logic to update the dirty cache lines counter for the dirtiest chunk of the primary memory.

8. The apparatus of claim 1, comprising the third logic to write second data to the primary memory for multiple cache lines in order of ascending primary memory addresses.

9. The apparatus of claim 1, wherein the dirtiest chunk of the primary memory has a highest number of dirty cache lines.

10. The apparatus of claim 1, wherein the third logic concurrently executes in a separate processing thread than one or more of the first logic and the second logic.

11. A method comprising:
    in a first processing thread, writing first data into a cache at a first cache line, setting the first cache line to dirty, and managing a dirty cache lines counter for each chunk of a primary memory; and
    in a second processing thread, determining a dirtiest chunk of the primary memory, getting a second cache line of the dirtiest chunk, and when the second cache line of the dirtiest chunk is dirty, reading the second cache line to get second data from the cache, writing the second data to the primary memory in order of ascending primary memory addresses, and setting the second cache line to clean, for each cache line in the dirtiest chunk of the primary memory, and managing the dirty cache lines counters.

12. The method of claim 11, comprising setting the first cache line to dirty by removing the first cache line from a list of clean cache lines when the first cache line is in the list of clean cache lines and by adding the first cache line to a head of a list of dirty cache lines.

13. The method of claim 12, comprising setting the second cache line to clean by removing the second cache line from the list of dirty cache lines and adding the second cache line to the list of clean cache lines.

14. The method of claim 13, comprising, in the first processing thread, evicting cache lines from the cache when a cache miss occurs.

15. The method of claim 14, comprising evicting a cache line from the cache by getting a third cache line from the list of clean cache lines, removing the third cache line from the list of clean cache lines, and returning the third cache line.

16. The method of claim 13, comprising when a cache miss does not occur, getting a fourth cache line to write the first data, determining if the fourth cache line is clean, and when clean determining a chunk of the primary memory and updating the dirty cache lines counter for the primary memory chunk.

17. The method of claim 11, comprising, in the second processing thread, updating the dirty cache lines counter for the dirtiest chunk of the primary memory.

18. The method of claim 11, comprising writing second data to the primary memory for multiple cache lines in order of ascending primary memory addresses.

19. At least one machine readable medium comprising a plurality of instructions that in response to being executed by a system at a computing platform cause the system to:
    in a first processing thread, write first data into a cache at a first cache line, set the first cache line to dirty, and manage a dirty cache lines counter for each chunk of a primary memory; and
    in a second processing thread, determine a dirtiest chunk of the primary memory, get a second cache line of the dirtiest chunk, and when the second cache line of the dirtiest chunk is dirty, read the second cache line to get second data from the cache, write the second data to the primary memory in order of ascending primary memory addresses, and set the second cache line to clean, for each cache line in the dirtiest chunk of the primary memory, and manage the dirty cache lines counters.

20. The at least one machine readable medium of claim 19, comprising instructions in the first processing thread to set the first cache line to dirty by removing the first cache line from a list of clean cache lines when the first cache line is in the list of clean cache lines and by adding the first cache line to a head of a list of dirty cache lines.

21. The at least one machine readable medium of claim 20, comprising instructions in the first processing thread to set the second cache line to clean by removing the second cache line from the list of dirty cache lines and adding the second cache line to the list of clean cache lines.

22. The at least one machine readable medium of claim 21, comprising instructions in the first processing thread to when a cache miss does not occur, get a fourth cache line to write the first data, determine if the fourth cache line is clean, and when clean determine a chunk of primary memory and update the dirty cache lines counter for the primary memory chunk.

23. The at least one machine readable medium of claim 19, comprising instructions in the second processing thread to update the dirty cache lines counter for the dirtiest chunk of the primary memory.

24. The at least one machine readable medium of claim 23, comprising instructions to write second data to the primary memory for multiple cache lines in order of ascending primary memory addresses.

25. A system comprising:
a primary memory;
a cache; and
a cache acceleration component including
first logic for execution by the cache acceleration component to manage a list of dirty cache lines and a list of clean cache lines, set a cache line to hot, set a cache line to clean, set a cache line to dirty, and evict a cache line from the cache;
second logic for execution by the cache acceleration component to write first data into the cache at a first cache line, request the first logic to set the first cache line to hot and to dirty, and manage a dirty cache lines counter for each chunk of the primary memory; and
third logic for execution by the cache acceleration component to determine a dirtiest chunk of the primary memory, get a second cache line of the dirtiest chunk, and when the second cache line of the dirtiest chunk is dirty, read the second cache line to get second data from the cache, write the second data to the primary memory, request the first logic to set the second cache line to clean, and manage the dirty cache lines counters;
wherein the third logic for execution by the cache acceleration component repeats the getting a second cache line of the dirtiest chunk, and when the second cache line of the dirtiest chunk is dirty, reading the second cache line to get second data from the cache, writing the second data to the primary memory, and requesting the first logic to set the second cache line to clean, for each cache line in the dirtiest chunk of the primary memory.

26. The system of claim 25, comprising the third logic to get a cache line of the dirtiest chunk, and when the cache line of the dirtiest chunk is dirty, read the cache line to get second data from the cache, write the second data to the primary memory, and request the first logic to set the cache line to clean, for each cache line in the dirtiest chunk of the primary memory.

27. The system of claim 25, comprising the third logic to write second data to the primary memory for multiple cache lines in order of ascending primary memory addresses.

28. The system of claim 25, wherein the third logic concurrently executes in a separate processing thread than one or more of the first logic and the second logic.

* * * * *